United States Patent Office 3,575,804
Patented Apr. 20, 1971

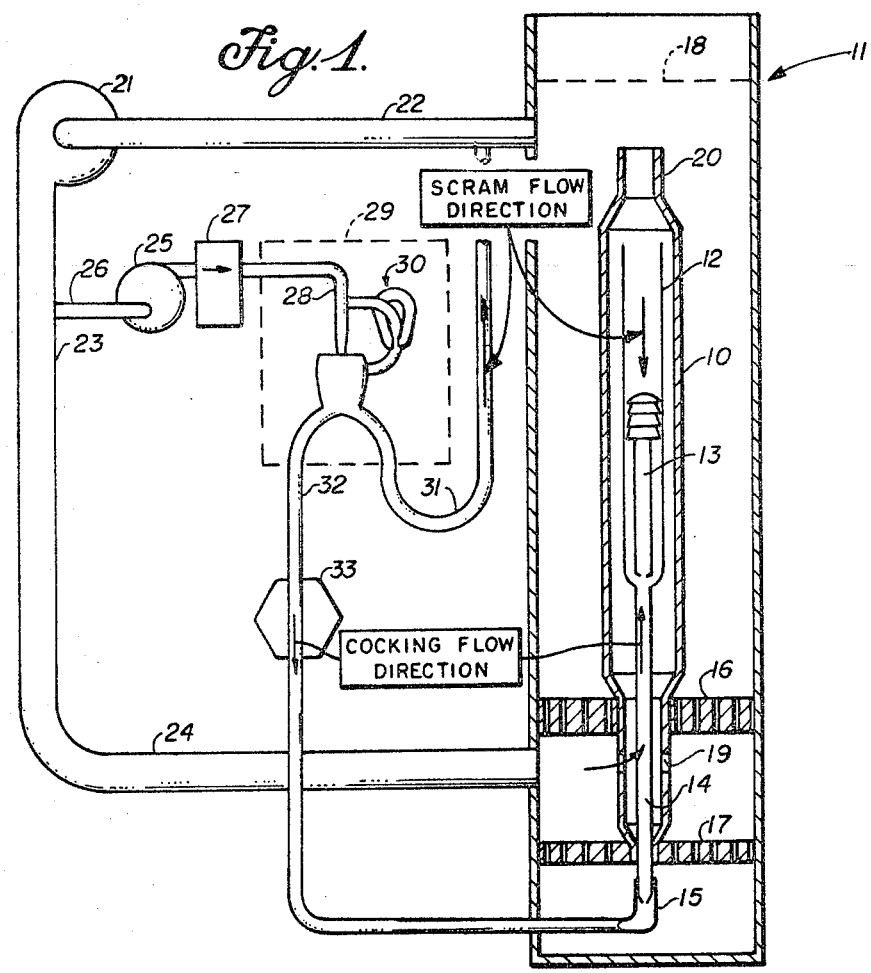
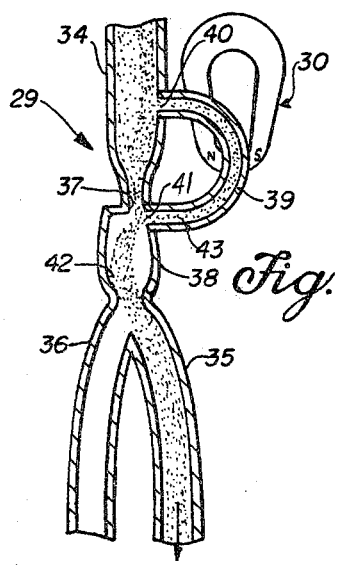
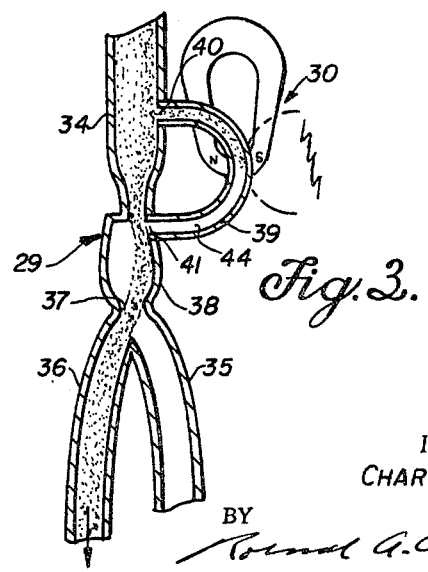

3,575,804
ELECTROMAGNETIC FLUID VALVE
Charles C. Ripley, San Jose, Calif., assignor to the United States of America as represented by the United States Atomic Energy Commission
Filed July 24, 1968, Ser. No. 747,160
The portion of the term of the patent subsequent to Dec. 30, 1986, has been disclaimed
Int. Cl. F15c 1/04, 4/00
U.S. Cl. 176—36          5 Claims

ABSTRACT OF THE DISCLOSURE

A hydraulically actuated control rod drive system for a nuclear reactor. The system utilizes an electrically conductive fluid and comprises basically electromagnetic fluid valve means having an input, two outputs and a continuous flowing primary fluid including control signal means using an electrically conductive secondary fluid for switching the primary fluid from one output to the other and flow control means including an electromagnetic induction throttle for controlling the flow of the secondary fluid in said control signal means.

BACKGROUND OF THE INVENTION

The invention described herein was made in the course of, or under Contract No. AT(04-3)-189, Project Agreement No. 47 with the United States Atomic Energy Commission.

This invention relates generally to nuclear reactor control rod elements, reflectors or shields, particularly to control rod driving or motivating devices and systems, and more particular to an electromagnetic fluid valve assembly adapted for controlling such devices or systems which utilizes no moving parts.

In nuclear reactors utilizing neutron absorbing control rods to control reactivity, it is desirable to have as reliable and as safe a control system as possible. Such control rod drive systems call for a high degree of reliability in the scram valves of any associated hydraulic systems to meet the reactor safety demands.

In the prior art, hydraulic actuating systems for reactor control rods have been used. However, these prior systems utilize mechanical devices such as valves having moving elements to control the flow of hydraulic fluid. As well known, mechanical parts, particularly moving parts, are subject to wear and need constant monitoring to insure satisfactory operation of the system.

Also, in nuclear reactors using liquid sodium as the reactor coolant as well as the force-transmitting fluid in a hydraulic actuated control rod system, corrosion and wear of the mechanical parts becomes a major problem. Any shutdown of the reactor for the purpose of inspection, servicing or replacing valves or other such parts represents a costly and time consuming operation.

SUMMARY OF THE INVENTION

The present invention overcomes these prior problems by providing a fluid valve means having no moving parts, the actuation thereof being accomplished without seals or moving elements by using an electromagnetic induction throttle, whereby the force-transmitting fluid is directed into one or the other of the two outlets of the valve by fluid tapped from the main stream via a bypass line controlled by the electromagnetic throttle.

Therefore, it is an object of this invention to provide a fluid valve having no moving parts.

A further object of the invention is to provide a fluid valve means which includes an electromagnetic throttling assembly.

Another object of the invention is to provide an electromagnetic valve means which utilizes fluid tapped through a bypass line for controlling the main flow of the fluid.

Another object of the invention is to provide a fluid switching or valving means for electrically conductive fluid which incorporates an electromagnetic pump for controlling the primary flow of fluid.

Another object of the invention is to provide a control rod system for a nuclear reactor, the activation of which is controlled by an electromagnetic fluid valve.

Other objects of the invention will become readily apparent from the following description and accompanying drawings wherein:

BRIEF DESCRIPTION OF THE DRAWINGS

FIG. 1 is a schematic view illustrating a reactor control rod system utilizing an embodiment of the inventive fluid valve means;

FIG. 2 is a schematic view illustrating the FIG. 1 valve means in the control rod scram dump or valve "off" position; and FIG. 3 is a view similar to FIG. 2 but in the control rod cocking or valve "on" position.

DESCRIPTION OF THE INVENTION

As pointed out above, in nuclear reactor control rod drive systems, reactor safety demands requires a high degree of reliability in the scram valves of any associated hydraulic systems. Thus, this invention is illustrated and described as a scram valve for controlling a nuclear reactor, but it is not intended to limit the invention to this particular application thereof. The present valve has a short actuation time and no moving parts either in the pilot or control function thereof, the actuation being accomplished without seals by using an electromagnetic induction throttle.

Referring now to FIG. 1, the elements of the control rod drive system incorporating the present invention comprise at least one control assembly generally indicated at 10 and with at least a portion thereof passing through the neutron field of a reactor core (not shown) positioned in a reactor vessel 11. Control assembly 10 includes a cylinder or tube 12 within which is located a free floating control rod and piston assembly 13, assembly 13 being constructed so as to enter or leave the neutron field of the reactor for controlling same as known in the art. In fluid communication with the lower end of cylinder 12 is a control flow inlet 14 which extends downwardly and into a control assembly plug-in seal 15. Reactor vessel 11 is provided with an upper grid 16 and a lower grid 17, the lower portion of control assembly 10 extending through grids 16 and 17 while the upper portion is surrounded by liquid metal coolant 18, such as sodium. Control assembly 10 is additionally provided intermediate grids 16 and 17 with a scram and coolant flow inlet 19, while the upper end of assembly 10 is configured to define a control and coolant flow outlet 20. A main coolant pump 21 is connected respectively via inlet and outlet conduits 22 and 23 with the upper portion of vessel 11 and the portion of the vessel intermediate grids 16 and 17, whereby the liquid metal coolant flow is directed from the high pressure side of pump 21, and indicated by arrow at 24, through conduit 23 into the scram and coolant flow inlet 19 of control assembly 10, upwardly through assembly 10 and out via outlet 20 into the upper portion of vessel 11 for recirculation to the low pressure side of pump 21 via inlet conduit 22.

A booster pump 25 having an inlet conduit 26 connected to outlet conduit 23 of the main pump 21 supplies liquid coolant via a filter 27 and outlet conduit 28 to the inventive fluidic valve unit generally indicated at 29 which includes an electromagnetic (EM) pilot or pump 30, the details of valve unit 29 being described hereinafter with respect to FIGS. 2 and 3. Connected to one of the outlets of valve unit 29 is a conduit 31, the other end of which is connected to main pump inlet conduit 22, while a conduit 32 is connected to the other of the valve unit 29 outlets, conduit 32 being connected at the other end thereof to the control assembly plug-in seal 15 and having an electromagnetic (EM) flowmeter 33 positioned therein. When fluid is flowing in conduit 32 it is referred to hereinafter as the "cocking flow" which functions to move the control rod and piston 13 upwardly within cylinder 12 of control assembly 10 and is indicated by the arrows and legend "cocking flow direction." When fluid is flowing in conduit 31 it is referred to hereinafter as the "scram dump" which functions to relieve the fluid pressure on control rod and piston 13 such that same moves downwardly in control assembly cylinder 12 in the scram or reactor "off" position, and is indicated by the arrows and legend "scram flow direction."

As illustrated in greater detail in FIGS. 2 and 3, the fluidic or electromagnetic fluid valve unit 29 is a fluidic divert type valve having a primary inlet port or passageway 34 and two outlet ports or passageways 35 and 36. The inlet passageway 34 terminates in a constriction defining a nozzle 37 which discharges into a chamber 38, outlet ports or passageways 35 and 36 being connected to chamber 38 in a γ configuration. A control or bypass line or passage 39 is connected or tapped into inlet passageway 34 upstream of nozzle 37, as indicated at 40, and connected or tapped into chamber 38 adjacent nozzle 37, indicated at 41. Chamber 38 is constructed in accordance with the Coanda effect and to provide a built-in hydraulic bias to favor positioning of the jet of fluid from nozzle 37 toward outlet passageway 35, which is connected to "scram dump" conduit 31 of FIG. 1, tap 41 being on the opposite side to the built-in bias toward the scram conduit. Throttling of the fluid flow through control or bypass passage 39 is achieved without seals or moving parts by the application of electrical energy, either AC or DC, from a source (not shown) to the electromagnetic (EM) pump or pilot 30 which causes a pressure to be developed within the bypass line or passage in a direction to buck or oppose the bypass fluid pressure therein. Since the details of such an electromagnetic pump are well known in the art, it is deemed that a description thereof is unnecessary to provide an understanding of the present invention.

In operation, as illustrated in FIG. 2, with the EM pilot or pump 30 "off" a power jet 42 produced by the primary or high pressure electrically conductive fluid, such as sodium, flowing through nozzle 37 is diverted, by the unobstructed flow of the secondary or high pressure fluid through control or bypass passage or line 39, as indicated at 43 by arrow and legend, against the wall of chamber 38 opposite tap 41 whereby the power jet 42 is diverted or directed by the Coanda effect and the configuration of chamber 38 into the scram dump passageway 35, which, as discussed above with respect to FIG. 1, shuts off the force-transmitting fluid beneath control rod and piston 13 of control assembly 10 thereby causing the shut down of the reactor. The Coanda effect, as known in the art, is the tendency of a flowing fluid to attach itself to the wall of the chamber along which it is flowing, this flow being directed by the use of curved surfaces and sharp corners of the chamber.

Upon activation of the EM pilot or pump 30, the bypass flow of electrically conductive fluid through control line or passage 39 is obstructed (see FIG. 3), as indicated at 44 by the arrow and legend, whereby the power jet 42 flows along the wall of chamber 38 adjacent tap 41 and is directed due to the Coanda effect and chamber design into passageway 36 which, as illustrated in FIG. 1 is connected to the "cocking line" or conduit 32, wherein the fluid is directed through control flow inlet 14 of control assembly 10 for moving the control rod and piston 13 upwardly in cylinder 12 thereby placing the reactor in "on" condition.

It is thus seen that controlled throttling of the bypass fluid by utilizing the electromagnetic pilot or pump 30 causes switching of the fluid power jet 42 from outlet 35 to outlet 36. Also, removal or failure of the electrical energy supply to pilot or pump 30 results in restoration of bypass flow and return of the fluid power jet to the outlet 35.

While the control or secondary fluid has been illustrated as being tapped off the force-transmitting or primary fluid via bypass line 39, this fluid can be supplied from another source, if desired.

By the use of the present invention, a fluid valve has been provided which requires no seals or moving parts and which in the specific application illustrated functions effectively as a control valve for a hydraulically actuated control rod drive system for a nuclear reactor.

Therefore, the present invention solves the prior problems created by the use of mechanical type valves utilizing seals and moving parts, particularly those moving parts which are in contact with corrosive fluids such as liquid metals used as coolant in nuclear reactors.

Although a particular embodiment and application of the invention has been illustrated and described, modifications will become apparent to those skilled in the art, and it is intended to cover in the appended claims all such modifications as come within the spirit and scope of the invention.

I claim:
1. A fluidic valve in combination with a control rod drive assembly for a liquid metal cooled reactor; said fluidic valve comprising: an inlet passageway for associated primary electrically conductive fluid terminating in one end of a chamber, said terminal end of said inlet passageway being of a smaller cross-section whereby associated fluid flowing therethrough creates a jet-like effect, a pair of outlet passageways connected to the opposite end of said chamber so as to define a γ configuration therewith, said chamber being constructed to define a hydraulic bias to favor directing associated primary fluid into one of said pair of outlet passageways, a control passage for associated secondary electrically conductive fluid having one end thereof terminating in said one end of said chamber and in a direction transverse with respect to the direction of said inlet passageway terminal end, said control passage being connected at the opposite end thereof to said inlet passageway at a spaced distance upstream from said terminal end of said inlet passageway, and electromagnetic means for controlling flow of associated secondary electrically conductive fluid through said control passage, said control rod drive assembly including a cylinder adapted to be located within a reactor vessel, a control rod mechanism freely positioned in said cylinder, first conduit means interconnecting one end of said cylinder with said one of said pair of outlet passageways of said fluidic valve, second conduit means providing fluid communication between said inlet passageway of said fluidic valve and at least the opposite end of said cylinder, fluid pressurizing means operatively mounted in said second conduit means for at least pressurizing fluid flowing into said inlet passageway and said control passage of said fluidic valve, and third conduit means interconnecting the other of said pair of outlet passageways of said fluid valve with said second conduit means at a point intermediate said fluid pressurizing means and said opposite end of said cylinder, whereby selective operation of said electromagnetic means causes associated primary fluid flowing through said fluidic valve to be directed by said chamber into said one of said pair of outlet passageways and into said first conduit means for applying fluid pressure to said control rod and piston mechanism for movement thereof in one direction in said cylinder, and whereby selective operation and failure of said electromagnetic means causes associated primary fluid flowing through said fluidic valve to be diverted by associated secondary fluid and directed by said chamber into said other of said pair of outlet passageways thereby removing fluid pressure from said control rod and piston mechanism allowing same to move in the opposite direction in said cylinder.

2. The combination defined in claim 1, wherein said electromagnetic means comprises an electromagnetic pump-like assembly which causes pressure to develop in said control passage in a direction to oppose the pressure of associated secondary fluid.

3. The combination defined in claim 1 wherein said reactor vessel contains a liquid metal coolant, said opposite end of said cylinder is in fluid communication with at least a portion of said reactor vessel, wherein said second conduit means is in fluid communication with said portion of said reactor vessel, and wherein the primary and said secondary fluids are liquid metal from the coolant of the reactor vessel.

4. The combination defined in claim 3, wherein said second conduit means includes a first section interconnecting said portion of said reactor vessel with another portion of said reactor vessel, and a second section interconnecting said first section with said inlet passageway of said fluidic valve.

5. The combination defined in claim 4, wherein said fluid pressurizing means includes a pair of pressurizing units, one of said pressurizing units being operatively connected in said first section of said second conduit means intermediate said portion of said reactor vessel and the point of interconnection of said first section with said second section of said second conduit means, and the second of said pressurizing units being operatively connected in said second section of said second conduit means upstream from the point of interconnection between said inlet passageway and said control passage of said fluidic valve.

References Cited

UNITED STATES PATENTS

| | | | |
|---|---|---|---|
| 3,151,596 | 10/1964 | McMurtrey | 60—203X |
| 3,171,421 | 3/1965 | Joesting | 137—815 |
| 3,273,594 | 9/1966 | Mayer | 137—815X |
| 3,331,379 | 7/1967 | Bowles | 137—815 |
| 3,336,749 | 8/1967 | Rom et al. | 60—203 |
| 3,416,549 | 12/1968 | Chaney et al. | 137—815 |
| 3,420,255 | 1/1969 | Wilkerson | 137—815 |
| 3,438,384 | 4/1969 | Hurvitz | 137—815 |
| 3,448,481 | 6/1969 | Jones, Jr. | 137—815X |

SAMUEL SCOTT, Primary Examiner

U.S. Cl. X.R.

137—81.5